(12) United States Patent
Bullock et al.

(10) Patent No.: US 12,077,891 B2
(45) Date of Patent: *Sep. 3, 2024

(54) INHERENTLY SECURED AEROGEL COMPOSITES

(71) Applicant: Aspen Aerogels, Inc., Northborough, MA (US)

(72) Inventors: Daniel E. Bullock, North Attleboro, MA (US); Aaron R. Tomich, Nashua, NH (US)

(73) Assignee: Aspen Aerogels, Inc., Northborough, MA (US)

( * ) Notice: Subject to any disclaimer, the term of this patent is extended or adjusted under 35 U.S.C. 154(b) by 217 days.

This patent is subject to a terminal disclaimer.

(21) Appl. No.: 17/320,814

(22) Filed: May 14, 2021

(65) Prior Publication Data

US 2021/0268765 A1 Sep. 2, 2021

Related U.S. Application Data

(60) Continuation of application No. 13/486,193, filed on Jun. 1, 2012, now Pat. No. 11,007,748, which is a
(Continued)

(51) Int. Cl.
*D04H 1/46* (2012.01)
*B29C 65/00* (2006.01)
(Continued)

(52) U.S. Cl.
CPC ............. *D04H 1/498* (2013.01); *B29C 65/56* (2013.01); *B29C 65/7437* (2013.01);
(Continued)

(58) Field of Classification Search
CPC ........ D04H 1/4374; D04H 1/46; D04H 1/498; D04H 3/102; D04H 3/105; D04H 5/02;
(Continued)

(56) References Cited

U.S. PATENT DOCUMENTS

| 2,188,007 A | 1/1940 | Kistler et al. |
| 2,994,617 A * | 8/1961 | Proctor ................ D06N 3/0015 |
| | | 264/156 |

(Continued)

FOREIGN PATENT DOCUMENTS

| DE | 4201868 A1 * | 7/1993 | ............. C03C 25/42 |
| FR | 2912427 A1 | 8/2008 | |

(Continued)

OTHER PUBLICATIONS

English Translation of JP 2000-080549-A (Sano). Doc Pub Mar. 21, 2000 (Year: 2000).*

(Continued)

*Primary Examiner* — Amy Vanatta
(74) *Attorney, Agent, or Firm* — Schwegman Lundberg & Woessner, P.A.

(57) ABSTRACT

Embodiments of the present invention describe secured fiber-reinforced aerogels and laminate structures formed therefrom. In one embodiment a laminate comprises at least one fiber-reinforced aerogel layer adjacent to at least one layer of fiber containing material wherein fibers from said at least one fiber-reinforced aerogel layer are interlaced with fibers of said at least one fiber-containing material. In another embodiment a laminate comprises at least two adjacent fiber-reinforced aerogel layers wherein fibers from at least one fiber-reinforced aerogel layer are interlaced with fibers of an adjacent fiber-reinforced aerogel layer.

19 Claims, 1 Drawing Sheet

Related U.S. Application Data continuation of application No. 12/685,240, filed on Jan. 11, 2010, now Pat. No. 8,214,980, which is a division of application No. 11/457,504, filed on Jul. 14, 2006, now abandoned.

(60) Provisional application No. 60/699,840, filed on Jul. 15, 2005.

(51) Int. Cl.
| | |
|---|---|
| *B29C 65/56* | (2006.01) |
| *B29C 65/74* | (2006.01) |
| *B29C 70/00* | (2006.01) |
| *B32B 5/02* | (2006.01) |
| *B32B 5/06* | (2006.01) |
| *B32B 5/10* | (2006.01) |
| *B32B 5/24* | (2006.01) |
| *B32B 5/26* | (2006.01) |
| *B32B 5/32* | (2006.01) |
| *B32B 37/00* | (2006.01) |
| *D04H 1/4374* | (2012.01) |
| *D04H 1/498* | (2012.01) |
| *B32B 37/24* | (2006.01) |
| *B32B 38/00* | (2006.01) |
| *B32B 38/08* | (2006.01) |

(52) U.S. Cl.
CPC .......... *B29C 66/022* (2013.01); *B29C 70/003* (2021.05); *B32B 5/022* (2013.01); *B32B 5/024* (2013.01); *B32B 5/06* (2013.01); *B32B 5/10* (2013.01); *B32B 5/245* (2013.01); *B32B 5/26* (2013.01); *B32B 5/32* (2013.01); *B32B 37/0076* (2013.01); *D04H 1/4374* (2013.01); *D04H 1/46* (2013.01); *B32B 2037/243* (2013.01); *B32B 2038/008* (2013.01); *B32B 38/08* (2013.01); *B32B 2250/02* (2013.01); *B32B 2250/20* (2013.01); *B32B 2260/021* (2013.01); *B32B 2262/00* (2013.01); *B32B 2266/0214* (2013.01); *B32B 2266/0242* (2013.01); *B32B 2266/0278* (2013.01); *B32B 2266/0285* (2013.01); *B32B 2266/053* (2016.11); *B32B 2266/057* (2016.11); *B32B 2266/126* (2016.11); *B32B 2305/022* (2013.01); *B32B 2305/026* (2013.01); *B32B 2305/07* (2013.01); *B32B 2305/08* (2013.01); *B32B 2305/20* (2013.01); *B32B 2305/28* (2013.01); *B32B 2307/202* (2013.01); *B32B 2307/302* (2013.01); *B32B 2307/3065* (2013.01); *B32B 2605/12* (2013.01); *B32B 2605/18* (2013.01); *Y10T 428/249924* (2015.04); *Y10T 428/249953* (2015.04); *Y10T 428/249955* (2015.04); *Y10T 428/24996* (2015.04); *Y10T 428/249967* (2015.04); *Y10T 428/249969* (2015.04); *Y10T 428/24997* (2015.04); *Y10T 442/3325* (2015.04); *Y10T 442/50* (2015.04); *Y10T 442/647* (2015.04); *Y10T 442/652* (2015.04)

(58) Field of Classification Search
CPC ...... D04H 13/005; D04H 18/00; D04H 18/02; B29C 65/56; B29C 65/62; B29C 65/64; B29C 65/7437; B29C 66/022; B29C 70/003; D06M 2400/02; B32B 5/022; B32B 5/06; B32B 5/10; B32B 5/245; B32B 5/26; B32B 5/32; B32B 37/0076; B32B 38/08; B32B 2037/243; B32B 2038/008; B32B 2250/02; B32B 2250/20; B32B 2260/021; B32B 2262/00; B32B 2266/0214; B32B 2266/0242; B32B 2266/0278; B32B 2266/0285; B32B 2266/053; B32B 2266/057; B32B 2266/126; B32B 2305/022; B32B 2305/026; B32B 2305/07; B32B 2305/08; B32B 2305/20; B32B 2305/28; B32B 2307/202; B32B 2307/302; B32B 2307/3065; B32B 2605/12; B32B 2605/18; B32B 2260/023; B32B 2262/14; B32B 2262/144; Y10T 428/249924; Y10T 428/249953; Y10T 428/249955; Y10T 428/24996; Y10T 428/249967; Y10T 428/249969; Y10T 428/24997; Y10T 442/3325; Y10T 442/50; Y10T 442/647; Y10T 442/652
USPC .................................................. 28/107–115
See application file for complete search history.

(56) References Cited

U.S. PATENT DOCUMENTS

| | | |
|---|---|---|
| 3,154,462 A | 10/1964 | Smith, II |
| 3,937,861 A | 2/1976 | Zuckerman et al. |
| 4,258,097 A | 3/1981 | Benedyk |
| 4,363,738 A | 12/1982 | Kummermehr |
| 4,447,345 A | 5/1984 | Kummermehr et al. |
| 4,619,908 A | 10/1986 | Cheng et al. |
| 4,667,417 A | 5/1987 | Graser et al. |
| 4,717,708 A | 1/1988 | Cheng et al. |
| 4,943,465 A | 7/1990 | Bailey et al. |
| 5,221,573 A | 6/1993 | Baigas, Jr. |
| 5,275,796 A | 1/1994 | Tillotson et al. |
| 5,306,555 A | 4/1994 | Ramamurthi et al. |
| 5,420,168 A | 5/1995 | Mayer et al. |
| 5,565,142 A | 10/1996 | Deshpande et al. |
| 5,786,059 A | 7/1998 | Frank et al. |
| 5,789,075 A | 8/1998 | Frank et al. |
| 5,830,387 A | 11/1998 | Yokogawa et al. |
| 5,866,027 A | 2/1999 | Frank et al. |
| 5,962,539 A | 10/1999 | Perrut et al. |
| 5,972,254 A | 10/1999 | Sander |
| 5,973,015 A | 10/1999 | Coronado et al. |
| 6,068,882 A | 5/2000 | Ryu |
| 6,080,475 A | 6/2000 | Frank et al. |
| 6,083,619 A | 7/2000 | Frank et al. |
| 6,087,407 A | 7/2000 | Coronado et al. |
| 6,140,377 A | 10/2000 | Schwertfeger et al. |
| 6,187,250 B1 | 2/2001 | Champagne |
| 6,197,270 B1 | 3/2001 | Sonoda et al. |
| 6,315,971 B1 | 11/2001 | Wallace et al. |
| 6,479,416 B1 | 11/2002 | Frank et al. |
| 6,620,355 B1 | 9/2003 | Schmidt |
| 6,656,527 B1 | 12/2003 | Gessner et al. |
| 6,670,402 B1 | 12/2003 | Lee et al. |
| 6,887,563 B2 | 5/2005 | Frank et al. |
| 6,989,123 B2 | 1/2006 | Lee et al. |
| 7,078,359 B2 | 7/2006 | Stepanian et al. |
| 7,399,439 B2 | 7/2008 | Lee et al. |
| 7,504,346 B2 | 3/2009 | Stepanian et al. |
| 7,635,411 B2 | 12/2009 | Rouanet et al. |
| 7,780,890 B2 | 8/2010 | Lee et al. |
| 8,214,980 B2 | 7/2012 | Bullock et al. |
| 11,007,748 B2 | 5/2021 | Bullock et al. |
| 2002/0090873 A1 | 7/2002 | Moody |
| 2002/0094426 A1 | 7/2002 | Stepanian et al. |
| 2003/0003284 A1* | 1/2003 | Schwertfeger ............ B32B 5/22 428/297.4 |
| 2004/0142168 A1 | 7/2004 | Hrubesh et al. |
| 2004/0244164 A1 | 12/2004 | Ferguson |
| 2005/0167891 A1 | 8/2005 | Lee et al. |
| 2005/0192366 A1 | 9/2005 | Ou et al. |
| 2005/0192367 A1 | 9/2005 | Ou et al. |
| 2005/0214501 A1* | 9/2005 | Baychar .................... B32B 5/24 442/373 |

(56) References Cited

U.S. PATENT DOCUMENTS

| | | |
|---|---|---|
| 2006/0013996 A1 | 1/2006 | Koyama et al. |
| 2006/0264132 A1 | 11/2006 | Leeser et al. |
| 2007/0014979 A1 | 1/2007 | Bullock et al. |
| 2007/0152363 A1 | 7/2007 | Begag et al. |
| 2007/0154698 A1 | 7/2007 | Stepanian |
| 2007/0284558 A1 | 12/2007 | Flay et al. |
| 2009/0229032 A1 | 9/2009 | Stepanian et al. |
| 2010/0015425 A1 | 1/2010 | Bindschedler et al. |
| 2010/0107381 A1 | 5/2010 | Bullock et al. |
| 2012/0097907 A1 | 4/2012 | Bauer et al. |
| 2012/0238174 A1 | 9/2012 | Bullock et al. |
| 2015/0017860 A1 | 1/2015 | Bullock et al. |
| 2021/0268764 A1 | 9/2021 | Bullock et al. |

FOREIGN PATENT DOCUMENTS

| | | | |
|---|---|---|---|
| JP | 2000-80549 A | 3/2000 | |
| WO | WO-9619607 A1 * | 6/1996 | ............. D04H 1/413 |
| WO | 02/070807 A1 | 9/2002 | |

OTHER PUBLICATIONS

"U.S. Appl. No. 11/457,504, Examiner Interview Summary mailed Sep. 19, 2008", 2 pgs.
"U.S. Appl. No. 11/457,504, Final Office Action mailed Jul. 9, 2009", 9 pgs.
"U.S. Appl. No. 11/457,504, Final Office Action mailed Nov. 18, 2008", 7 pgs.
"U.S. Appl. No. 11/457,504, Non Final Office Action mailed Mar. 18, 2008", 6 pgs.
"U.S. Appl. No. 11/457,504, Response filed Mar. 6, 2008 to Restriction Requirement mailed Feb. 19, 2008", 3 pgs.
"U.S. Appl. No. 11/457,504, Response filed May 18, 2009 to Final Office Action mailed Nov. 18, 2008", 6 pgs.
"U.S. Appl. No. 11/457,504, Response filed Sep. 18, 2008 to Non Final Office Action mailed Mar. 18, 2008", 6 pgs.
"U.S. Appl. No. 11/457,504, Restriction Requirement mailed Feb. 19, 2008", 7 pgs.
"U.S. Appl. No. 12/685,240, Non Final Office Action mailed Sep. 16, 2011", 8 pgs.
"U.S. Appl. No. 12/685,240, Notice of Allowance mailed May 14, 2012", 8 pgs.
"U.S. Appl. No. 12/685,240, Response filed Mar. 16, 2012 to Non Final Office Action mailed Sep. 16, 2011", 7 pgs.
"U.S. Appl. No. 12/685,240, Response filed Jul. 5, 2011 to Restriction Requirement mailed Jan. 5, 2011", 2 pgs.
"U.S. Appl. No. 12/685,240, Restriction Requirement mailed Jan. 5, 2011", 6 pgs.
"U.S. Appl. No. 13/486,193, Advisory Action mailed Jan. 6, 2020", 3 pgs.
"U.S. Appl. No. 13/486,193, Advisory Action mailed Jul. 8, 2014", 4 pgs.
"U.S. Appl. No. 13/486,193, Appeal Brief filed Mar. 27, 2015", 46 pgs.
"U.S. Appl. No. 13/486,193, Appeal Brief filed May 27, 2016", 58 pgs.
"U.S. Appl. No. 13/486,193, Appeal Brief filed Sep. 30, 2014", 38 pgs.
"U.S. Appl. No. 13/486,193, Appeal Decision mailed Sep. 28, 2017", 10 pgs.
"U.S. Appl. No. 13/486,193, Decision on Reconsideration mailed Jan. 26, 2018", 12 pgs.
"U.S. Appl. No. 13/486,193, Examiner Interview Summary mailed Jan. 13, 2021", 2 pgs.
"U.S. Appl. No. 13/486,193, Examiner Interview Summary mailed Feb. 12, 2020", 3 pgs.
"U.S. Appl. No. 13/486,193, Examiner Interview Summary mailed May 19, 2014", 3 pgs.
"U.S. Appl. No. 13/486,193, Examiner Interview Summary mailed Jun. 14, 2013", 3 pgs.
"U.S. Appl. No. 13/486,193, Examiner Interview Summary mailed Dec. 11, 2014", 3 pgs.
"U.S. Appl. No. 13/486,193, Examiner's Answer mailed Aug. 17, 2016", 11 pgs.
"U.S. Appl. No. 13/486,193, Final Office Action mailed Mar. 31, 2014", 7 pgs.
"U.S. Appl. No. 13/486,193, Final Office Action mailed Apr. 12, 2013", 6 pgs.
"U.S. Appl. No. 13/486,193, Final Office Action mailed Oct. 25, 2019", 11 pgs.
"U.S. Appl. No. 13/486,193, Final Office Action mailed Dec. 28, 2015", 10 pgs.
"U.S. Appl. No. 13/486,193, Final Office Action mailed Dec. 31, 2018", 10 pgs.
"U.S. Appl. No. 13/486,193, Non Final Office Action mailed Apr. 25, 2018", 10 pgs.
"U.S. Appl. No. 13/486,193, Non Final Office Action mailed Jun. 10, 2020", 8 pgs.
"U.S. Appl. No. 13/486,193, Non Final Office Action mailed Jul. 16, 2019", 10 pgs.
"U.S. Appl. No. 13/486,193, Non Final Office Action mailed Jul. 24, 2015", 10 pgs.
"U.S. Appl. No. 13/486,193, Non Final Office Action mailed Sep. 20, 2013", 8 pgs.
"U.S. Appl. No. 13/486,193, Non Final Office Action mailed Oct. 31, 2014", 11 pgs.
"U.S. Appl. No. 13/486,193, Non Final Office Action mailed Nov. 6, 2012", 6 pgs.
"U.S. Appl. No. 13/486,193, Notice of Allowance mailed Jan. 19, 2021", 16 pgs.
"U.S. Appl. No. 13/486,193, Reply Brief filed Oct. 17, 2016", 19 pgs.
"U.S. Appl. No. 13/486,193, Response filed Mar. 16, 2018 to Decision on Reconsideration mailed Jan. 26, 2018", 12 pgs.
"U.S. Appl. No. 13/486,193, Response filed Mar. 19, 2014 to Non Final Office Action mailed Sep. 20, 2013", 11 pgs.
"U.S. Appl. No. 13/486,193, Response filed Apr. 5, 2013 to Non Final Office Action mailed Nov. 6, 2012", 6 pgs.
"U.S. Appl. No. 13/486,193, Response filed Apr. 23, 2020 to Advisory Action mailed Jan. 6, 2020", 15 pgs.
"U.S. Appl. No. 13/486,193, Response filed Jun. 27, 2014 to Final Office Action mailed Mar. 31, 2014", 7 pgs.
"U.S. Appl. No. 13/486,193, Response filed Jun. 28, 2019 to Final Office Action mailed Dec. 31, 2018", 10 pgs.
"U.S. Appl. No. 13/486,193, Response filed Sep. 12, 2013 to Final Office Action mailed Apr. 12, 2013", 6 pgs.
"U.S. Appl. No. 13/486,193, Response filed Oct. 10, 2012 to Restriction Requirement mailed Sep. 21, 2012", 2 pgs.
"U.S. Appl. No. 13/486,193, Response filed Oct. 16, 2019 to Non Final Office Action mailed Jul. 16, 2019", 13 pgs.
"U.S. Appl. No. 13/486,193, Response filed Oct. 25, 2018 to Non Final Office Action mailed Apr. 25, 2018", 11 pgs.
"U.S. Appl. No. 13/486,193, Response filed Nov. 20, 2015 to Non Final Office Action mailed Jul. 24, 2015", 21 pgs.
"U.S. Appl. No. 13/486,193, Response filed Dec. 10, 2020 to Non Final Office Action mailed Jun. 10, 2020", 15 pgs.
"U.S. Appl. No. 13/486,193, Response filed Dec. 26, 2019 to Final Office Action mailed Oct. 25, 2019", 13 pgs.
"U.S. Appl. No. 13/486,193, Restriction Requirement mailed Sep. 21, 2012", 5 pgs.
"Definition of foam", Merriam-Webster Online Dictionary, [Online]. Retrieved from the Internet: <URL: https://www.merriam-webster.com/dictionary/foam#:~:text=Medical%20Definition-,foam,the%20surface%20of%20a%20liquid>, (Accessed Aug. 3, 2023), 6 pgs.
"English Translation of JP 2000-080549", 10 pgs.
U.S. Appl. No. 11/457,504, filed Jul. 14, 2006, Secured aeorgel composites and methods of manufacture thereof.
U.S. Appl. No. 12/685,240 U.S. Pat. No. 8,214,980, filed Jan. 11, 2010, Methods of Manufacture of Secured Aerogel Composites.

(56) References Cited

OTHER PUBLICATIONS

U.S. Appl. No. 13/486,193 U.S. Pat. No. 11,007,748, filed Jun. 1, 2012, Inherently Secured Aerogel Composites.

* cited by examiner

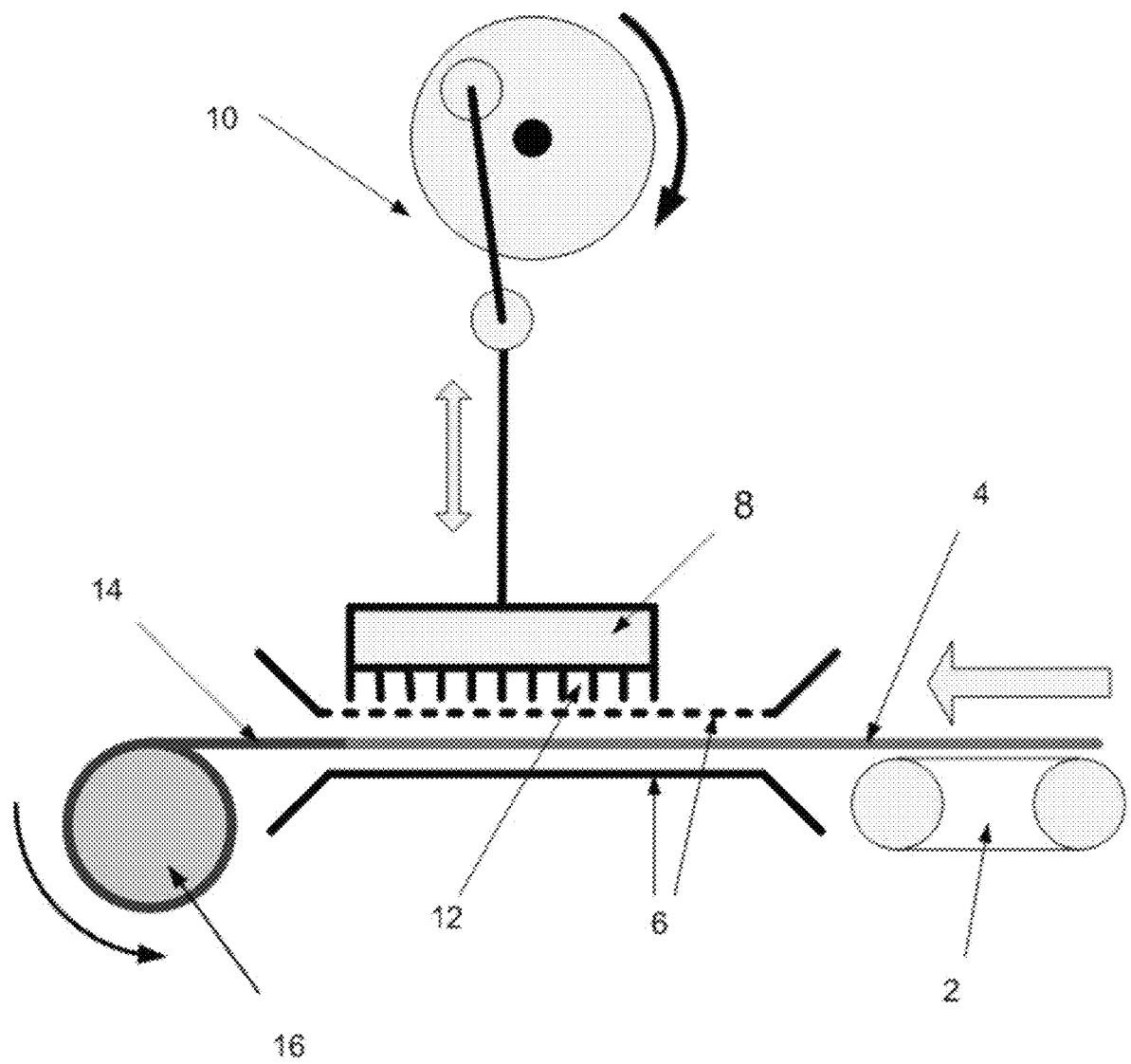

INHERENTLY SECURED AEROGEL COMPOSITES

CROSS-REFERENCES TO RELATED APPLICATIONS

This application is a continuation of U.S. patent application Ser. No. 13/486,193 filed on Jun. 1, 2012, which is a continuation of U.S. patent application Ser. No. 12/685,240 filed Jan. 11, 2010, which is a divisional application of U.S. patent application Ser. No. 11/457,504 filed Jul. 14, 2006, which claims the benefit of priority from U.S. Provisional Patent Application No. 60/699,840 filed on Jul. 15, 2005. This application is also related to U.S. patent application Ser. No. 14/466,663 filed on Jul. 30, 2014. All of the aforementioned applications are hereby incorporated by reference in their entirety as if fully set forth.

SUMMARY OF THE INVENTION

Embodiments of the present invention describe secured fiber-reinforced aerogels and laminate structures formed therefrom. In one embodiment a laminate comprises at least one fiber-reinforced aerogel layer adjacent to at least one layer of fiber-containing material wherein fibers from said at least one fiber-reinforced aerogel layer are interlaced with fibers of said at least one fiber-containing material. The layer of fiber-containing material can comprise a fiber-reinforced foam composite or fiber-reinforced polymeric composite. Alternatively, or in addition to, the layer of fiber-containing material can comprise a felt, batting, lofty batting, mat, woven fabric, non-woven fabric or a combination thereof. The aerogel layer can comprise a felt, batting, lofty batting, mat, woven fabric, non-woven fabric or a combination thereof. In some embodiments a functional layer that is radiation absorbing, radiation reflecting, thermally conductive or electrically conductive is used. In another embodiment, a laminate comprises at least two adjacent fiber-reinforced aerogel layers wherein fibers from at least one fiber-reinforced aerogel layer are interlaced with fibers of an adjacent fiber-reinforced aerogel layer. Again the fiber-reinforced aerogel layer can comprise a felt, batting, lofty batting, mat, woven fabric, non-woven fabric or a combination thereof. Also again this laminate can comprise a functional layer that is radiation absorbing, radiation reflecting, thermally conductive or electrically conductive. One method of practicing an embodiment of the present invention includes the steps of:
  a) disposing a laminate comprising at least one layer of a fiber-containing material adjacent to at least one fiber-reinforced aerogel layer beneath at least one felting needle and where at least one layer being a top layer that defines an exposed surface; and
  b) penetrating said laminate through said exposed surface with said at least one felting needle thereby transporting fibers within the laminate.
Another method comprises the steps of:
  a) disposing a laminate comprising at least two layers of adjacent fiber reinforced aerogels beneath at least one felting needle and where at least one layer being a top layer that defines an exposed surface; and
  b) penetrating said laminate through said exposed surface with said at least one felting needle thereby transporting fibers within the laminate.

BRIEF DESCRIPTION OF THE DRAWINGS

FIG. 1 is a perspective view of one embodiment of the needle-punching process of the present invention.

DESCRIPTION

Manipulation of aerogels, one of the best known insulators, can be very challenging given the fragility of this material form. The development of fiber-reinforced aerogels has yielded a more adaptable aerogel composite form with improved mechanical properties such as conformability and flexibility without any substantial loss of thermal insulation performance. However, few methodologies have yet been developed for securing or attaching these fiber reinforced forms. Moreover, securing mechanisms that do not involve an extrinsic component such as stitches, tags, rivets, adhesives, staples, tapes, and the like have remained virtually unexplored. Extrinsic components are undesirable considering that they can: add weight, fail under the adverse conditions (high thermal loads, cryogenic temperatures, etc.) and can increase production cost. For instance, most adhesives do not perform well and ultimately fail at cryogenic temperatures such as those encountered by insulation systems in liquid natural gas (LNG) pipelines. At high operating temperatures, many adhesives tend to burn off, plastic tags can melt and stitchings may fail. Such tendencies are likely to be experienced by aerogel based fireproofing systems, or other high temperature applications such as the hot sections of aircraft engines and solid rocket motors.

To date, typical mechanical tacking methods for fiber reinforced aerogels require the introduction of an extrinsic component, such as a metal rivet or a fiber stitch. As is the case with chemical systems, the introduction of a foreign material to the insulation system is likely to limit the acceptable operating conditions of the system. In the case of a weight sensitive product, such as insulation or fireproofing systems for marine or space vehicles, the weight pick-up gained by adding metal rivets or tags is undesirable. For this and various other reasons it is clear that a need for securing methods which do not utilize extrinsic components still persists for fiber-reinforced aerogels.

Embodiments of the present invention describe methods for securing fiber-reinforced-aerogels and products derived therefrom. In particular, current embodiments exploit the benefits of needle-punching technology for manipulating fiber reinforced aerogels. For instance a plurality of layers comprising aerogels reinforced with a batting or felt can be tacked together using the needle punching process. Also, aerogel blankets along with other fibrous layers can be secured accordingly. This system minimizes added weight, eliminates need for fallible external components and without compromising thermal insulating performance.

One aspect of the present invention involves methods for securing fiber-reinforced aerogels to: fiber-containing materials, fiber-reinforced aerogels, or both. This can be accomplished by via "needle-punching" technique; also sometimes known as "needling." Another aspect relates to laminates or multiple layered structures comprising at least one layer of fiber-reinforced aerogel secured to a fiber-containing material, a fiber-reinforced aerogel or both. "Fiber-containing material" as used herein denotes any material with fibers conducive to needle-punching. In other words fibers in the fiber-containing material can intermix, interpenetrate, intertwined, interlaced, interwoven or entangle with fibers of another material as a result of needle-punching. When the word "interlaced" is used, it is meant to encompass one or more or all of the preceding verbs to illustrate how fibers are in the embodiments of the invention. Fiber-containing materials may be exemplified by, but not limited to fibrous structures, fiber-reinforced foam composites or fiber-reinforced polymeric composites. Fibrous structures are further exemplified by, but not limited to: felts, battings, lofty battings, mats, woven fabrics, non-woven fabrics or combinations thereof. Suitable fiber compositions include essentially all natural and synthetic fibers which may be based on organic, inorganic or both compounds. Examples of natural fibers include, but are not limited to: wool, cotton, silk, linen, hemp, ramie, and jute. Examples of synthetic fibers include, but are not limited to: acetate, acrylic, latex, nylon, polyester, rayon, spandex.

Other fibers may be based on fiberglass, quartz, polyethylene, polypropylene, polybenzimidazole (PBI), polyphenylenebenzo-bisoxasole (PBO), polyetheretherketone (PEEK), polyarylate, polyacrylates, polytetrafluoroethylene (PTFE), poly-metaphenylene diamide, poly-paraphenylene terephthalamide, ultra high molecular weight polyethylene (UHMWPE), novoloid resins, polyacryolintrile (PAN), polyacrylonitrile-carbon and carbon fibers.

Needle-punching is a known technique for attaching or orienting non-woven fiber-containing materials into stable, usable forms. Needle-punched non-wovens are prepared via mechanical orientation and interlocking of fibers such as those in a spun bonded or carded web form. For instance, effective mechanical interlocking between layers is achieved via a plurality of barbed felting needles passing into and out of the fiber mass (at varying locations) where the barbs on the needles carry fibers from one ply through to another. The displaced fibers generated by the needling process are often referred to as "Z-fibers" since they are generally perpendicular to the plane of the fibrous layer. Examples of needle-punched final products are: tennis court surfaces, space shuttle tiles, boat hull composites, automotive carpeting, automotive insulation, filtration media, geo textiles, vinyl substrates, primary carpet backing, secondary carpet backing, fiberglass matting, ballistic felts, tennis ball felts, aerospace brake pads, oil absorbents, and many others.

FIG. 1 is an exemplary needle-punching process. Here, the laminate 4 (containing fiber reinforced aerogel+fiber containing material or two or more fiber reinforced aerogels) is fed into a needle-loom 6 via feed rolls 2. A bed of needles 12 secured to a beam board 8 is cyclically driven using a main drive 10 to penetrate the layers in consecutive sections resulting in the needle-punched products 14 which are subsequently wound using draw off rolls 16. In the context of certain embodiments of the present invention, said layers 4 comprise a layer of fiber-reinforced aerogel and: at least one layer of a fiber-containing material, at least one layer of another fiber reinforced aerogel, or both. Other forms of needle punching that are applicable to embodiments of the present invention involve needle punching via a structuring loom or random velour loom. Furthermore needle-punching can be carried out discontinuously for example where distinct sections are needle-punched in one shot. Various other modifications can be used for the needle punching process depending on the fabrication needs. For instance, a needle punching device enabling measurement of penetration depth is described in WO02070807A1 hereby incorporated by reference. Hence it should be recognized that the needle-punching concept as a whole is embraced by the embodiments presented herein.

As noted earlier, aerogels describe material forms with typically excellent thermal insulation, among other properties. As used herein, "aerogel" and "aerogel materials" refer to gel containing air as a dispersion medium in a broad sense and gels dried via supercritical fluids in a narrow sense. The chemical composition of aerogels can be inorganic, organic (including polymers) or hybrid organic-inorganic. Inorganic aerogels may be based on Silica, Titania, Zirconia, Alumina, Hafnia, Yttria, Ceria, Carbides and Nitrides. Organic aerogels can be based on compounds including but are not limited to:

urethanes, resorcinol formaldehydes, polyimide, polyacrylates, chitosan, polymethylmethacrylate, members of the acrylate family of oligomers, trialkoxysilyl terminated polydimethylsiloxane, polyoxyalkylene, polyurethane, polybutadiene, melamine-formaldehyde, phenol-furfural, a member of the polyether family of materials or combinations thereof. Examples of organic-inorganic hybrid aerogels include, but are not limited to: silica-PMMA, silica-chitosan, silica-polyether or possibly a combination of the aforementioned organic and inorganic compounds. Published US patent applications 2005/0192367 and 2005/0192366 teach extensively of such hybrid organic-inorganic materials and are hereby incorporated by reference in their entirety. In the preferred embodiments of the present invention, silica aerogels are discussed whereas the invention as a whole may be practiced with other aerogel compositions as well. The preferred method of preparing aerogels in the current embodiments is via drying of gels derived the sol-gel process. Said process is described in great detail in Brinker C. J., and Scherer G. W., Sol-Gel Science; New York: Academic Press, 1990 which is hereby incorporated by reference.

Gels may be additionally aged prior to drying to further strengthen the network structure thereof by increasing the number of cross-linkages. This procedure is potentially useful for preventing potential volume loss during drying. Aging can involve: maintaining the gel (prior to drying) at a quiescent state for an extended period, maintaining the gel at elevated temperatures, addition of cross-linkage promoting compounds or any combination thereof. Aging time period typically requires between about 1 hr and several days. The preferred temperatures are usually between about 10° C. and about 100° C.

For optimal thermal insulation, aerogels can be opacified to reduce the radiative component of heat transfer. At any point prior to gel formation, opacifying compounds, radiation absorbing compounds, radiation reflecting compounds, thermally conductive components, electrically conductive components, radar blocking components may be dispersed into the mixture comprising gel precursors. Examples of opacifying compounds include and are not limited to: $B_4C$, Diatomite, Manganese ferrite, MnO, NiO, SnO, $Ag_2O$, $Bi_2O_3$, TiC, WC, carbon black, titanium oxide, iron titanium oxide, zirconium silicate, zirconium oxide, iron (I) oxide, iron (III) oxide, manganese dioxide, iron titanium oxide (ilmenite), chromium oxide, silicon carbide or mixtures thereof.

Aerogels may be surface treated to impart or improve hydrophobicity. The hydrophobic treatment is carried out by reacting a hydroxy moiety of a silanol group present on a surface of the wet-gel compound (silica gel) with a functional group of a hydrophobing agent thereby converting the silanol group into a hydrophobic group of the hydrophobicity-imparting agent.

For example, the hydrophobing treatment can be carried out by immersing a gel in a hydrophobicity-imparting solution of a hydrophobing agent in a solvent, and mixing the gel and the solution to allow the hydrophobicity-imparting agent to permeate the gel, while if necessary, heating such a gel mixture so that a hydrophobicity-imparting reaction occurs. Examples of the solvent for use in the hydrophobing treatment include methanol, ethanol, isopropanol, xylene, toluene, benzene, N,N-dimethylformamide, hexamethyldisiloxane and the like. There is no particular limit in selection of the solvent, in so far as the solvent can easily dissolve the hydrophobing agent and can replace the solvent contained in the gel before the hydrophobing treatment. Where the supercritical drying is carried out after the hydrophobing treatment, the solvent to be used in the hydrophobing treatment is preferably a medium that facilitates the supercritical drying (e.g., methanol, ethanol, isopropanol, liquefied carbon dioxide or the like), or a medium which can be replaced with the former medium. Examples of the hydrophobing agent include hexamethyldisilazane, hexamethyldisiloxane, trimethylmethoxysilane, dimethyldimethoxysilane, methyltrimethoxysilane, ethyltrimethoxysilane, trimethylethoxysilane, dimethyldiethoxysilane, methyltriethoxysilane and the like. Hydrophobing treatments are further described in U.S. Pat. No. 5,565,142 hereby incorporated by reference.

Drying plays an important role in engineering the properties of aerogels, such as porosity and density which influence the material thermal conductivity. To date, numerous drying methods have been explored. U.S. Pat. No. 6,670,402 teaches drying via rapid solvent exchange of solvent(s) inside wet gels using supercritical $CO_2$ by injecting supercritical, rather than liquid, $CO_2$ into an extractor that has been pre-heated and pre-pressurized to substantially supercritical conditions or above to produce aerogels. U.S. Pat. No. 5,962,539 describes a process for obtaining an aerogel from a polymeric material that is in the form a sol-gel in an organic solvent, by exchanging the organic solvent for a fluid having a critical temperature below a temperature of polymer decomposition, and supercritically drying the fluid/sol-gel. U.S. Pat. No. 6,315,971 discloses processes for producing gel compositions comprising: drying a wet gel comprising gel solids and a drying agent to remove the drying agent under drying conditions sufficient to minimize shrinkage of the gel during drying. Also, U.S. Pat. No. 5,420,168 describes a process whereby Resorcinol/Formaldehyde aerogels can be manufactured using a simple air drying procedure. Finally, U.S. Pat. No. 5,565,142 herein incorporated by reference describes subcritical drying techniques. The embodiments of the present invention can be practiced with drying using any of the above techniques. In some embodiments, it is preferred that the drying is performed at vacuum to below super-critical pressures (pressures below the critical pressure of the fluid present in the gel at some point) and optionally using surface modifying agents.

Aerogels may be fiber-reinforced with various fibrous structures to achieve a more conformable composite product. Suitable fibrous structures include, but are not limited to wovens, non-wovens, mats, felts, battings, lofty battings and combinations thereof. Aerogel composites reinforced with a fibrous batting, herein referred to as "blankets", are particularly useful for applications requiring flexibility since they are highly conformable and are excellent thermal insulators. Aerogel blankets and similar fiber-reinforced aerogel composites are described in published US patent application 2002/0094426A1 and U.S. Pat. Nos. 6,068,882; 5,789,075; 5,306,555; 6,887,563 and 6,080,475 all hereby incorporated by reference, in their entirety. Fiber reinforced aerogels of 2002/0094426 are particularly useful in the embodiments herein where a continuous aerogel matrix or a "monolithic" aerogel matrix is reinforced by a fiber component like a fibrous batting. It is noted here that an aerogel blanket is a flexible aerogel composite that can be used like a blanket to cover surfaces of simple or complex geometry.

Applications involving aerogel blankets can benefit tremendously from the needle punching technique. This novel method for manipulating aerogel blankets can be used in a variety of applications involving attachment of the blankets to any other fibrous materials and/or creating a coherent lay up of insulating plies. Although the aerogel matrix might be locally disrupted upon needle penetration, the integrity of the needled end-product is usually not compromised. In order to optimize needle punching of fiber-reinforced aerogel composites the following factors are worth considering: needle puncture density, needle penetration depth, needle characteristics (crank, shank, blade, barb, point, etc.), aerogel density, aerogel material (Organic, inorganic, hybrid organic-inorganic), fiber/aerogel volume ratio, fiber forms (batting, felt, mat, chopped fibers) and fiber compositions (polyester, carbon, silica, etc.) Needles with the desired attributes such as crank, shank, blade, barb, point properties, aspect ratio or modulus can be obtained from a variety of vendors such as Foster Needle inc. Examples of companies that currently engage in manufacture of needle-punched products include Shoo Shyng Machinery co., Ltd. and American Felt and Filter Company (AFFCO.) Insulation systems often require several inches in thickness in order to achieve the overall required R-value (R=resistance to heat flow.) Larger overall R values are achieved by stacking multiple plies of an insulating material, since R values of individual plies simply add up. Though not wishing to be bound by theory, temporal considerations related to the kinetics of sol-gel chemistry of gel preparation (and subsequent drying), suggests that an upper limit on fiber-reinforced aerogel thickness often exists (for example ½") when manufactured in a cost-effective manner. As such, requirements for certain insulation applications involving fiber-reinforced aerogels must be met by constructing a laminate (i.e. multiple ply) comprising secured insulation layers.

In one embodiment a laminate comprises at least one fiber-reinforced aerogel layer adjacent to at least one layer of fiber-containing material wherein fibers from said at least one fiber-reinforced aerogel layer are interlaced with fibers of said at least one fiber-containing material. The layer(s) of fiber-containing material can comprise a felt, batting, lofty batting, mat, woven fabric, non-woven fabric or combinations thereof. Alternatively or in addition to, the layer(s) of fiber-containing material can comprise a fiber-reinforced foam composite or fiber-reinforced polymeric composite. The layers can be needle-punched once to form the final laminate. Alternatively, successive layers can be individually needle punched each time to add to the stack. Potential applications include instances where an aerogel blanket can is needled to a carpet as a backing, to an apparel article as lining, or to a fibrous surface as a thermal shield.

In another embodiment a laminate comprises at least two adjacent fiber-reinforced aerogel layers wherein fibers from at least one fiber-reinforced aerogel layer are interlaced with fibers of an adjacent fiber-reinforced aerogel layer. The layers can be needle-punched once to form the final laminate. Alternatively, successive layers can be individually needle punched each time to add to the stack.

In yet another embodiment, a laminate comprises at least two layers of fiber-reinforced aerogels and a fiber-containing material there between. Preferably the fiber containing material is selected from felt, batting, lofty batting, mat, woven fabric, non-woven fabric or combinations thereof.

This arrangement may be particularly useful for instances where fiber-reinforced aerogels do not secure well to one another after needling wherein the in between layer serves to better secure the layers to one another.

In a special embodiment, at least one functional layer is incorporated into the laminate structure comprising fiber-reinforced aerogels via needle punching. The functional layer may be radiation absorbing, radiation reflecting, thermally conductive or electrically conductive. Metallic sheets, metallized polymeric sheets and the like are few non limiting examples. Of course it is desirable that the functional layer be compliant with needle punching such that this process is not hindered.

In yet another embodiment, the thermal conductivity of the fiber interlaced laminate is substantially same as that of the fiber reinforced aerogel component. In other words, any mechanical damage caused by needling process was surprisingly negligible and hence interlacing using different embodiments of the present invention prove to be very useful for securing fiber reinforced aerogel to a fiber containing material or for securing more than one layers of fiber reinforced aerogel layers.

In another special embodiment, a laminate is formed from angular needling of the layers. In other words, at least one layer of fiber reinforced aerogel is needled at an angle non-perpendicular to the plane of said layer. More specifically, the laminate is needled at least twice at different angles preferably creating cross-entanglement of the drawn fibers.

In another embodiment, a blanket is needled to a fibrous structure wherein said fibrous structure is subsequently permeated with a polymeric material and which is cured therein. The result is a polymeric coating on a fiber reinforced aerogel. Said coating can be highly useful for instance, as an abrasion or chemical resistant layer for the aerogel. Additionally, the fiber reinforced aerogel can be molded to a shape and held in place with a hard coating. The following is one exemplary mode:
   a) Fiber reinforced aerogel needled to a fibrous structure such as felt, batting, lofty batting, mat, woven fabric, non-woven fabric or combinations thereof, thereby forming a laminate structure;
   b) The laminate structure is bent or otherwise manipulated to a desired shape, and held in place;
   and c) A polymeric material is transferred into the fibrous structure and cured therein.

Various shapes might be achievable with this structure Such as half-pipes, hemispheres, and various others. Thus preformed shaped aerogel insulations are made possible via this method.

In another special embodiment, fiber reinforced wet gels are needled prior to drying to form a laminate structure. A "wet gel" may be understood as the un-dried gel comprising solvent and/or diluent filled pores. The laminates prepared accordingly are subsequently dried via techniques previously discussed. Methods for producing such gel sheets is described in published US patent application 2005/0167891A1 which is incorporated by reference in its entirety. An advantage in needling wet gels is that less damage to the overall aerogel matrix is sustained relative to needling after the aerogel is dried. Furthermore, needling the fiber-reinforced wet-gel to of fibrous layer, for instance a low density lofty batting, can serve as a spacing layer, for enhancing flow of the drying medium (e.g. supercritical fluid) once a wet aerogel blanket is rolled and transferred to the drying, preferably in a supercritical fluid drying.

The individual layers of the laminate can be of any thickness but in a preferred embodiment, it is between about $1/16$ in and about $1/2$ in. The final product will have an R value that is the sum or better than the sum of each individual aerogel blanket R value thereby providing similar or improved thermal performance relative to a single blanket layer of the same thickness. This procedure can be repeated to add layers to an already needle punched stack.

In yet another embodiment, external fibers or yarns are introduced using needles through the layers of the laminate such that the layers of the aerogel laminate are quilted together.

There are various art recognized quilting techniques that can be used. The variables such as quilting patterns, needle size (length and thickness), external (external to the layers of the laminate) fiber type and thickness and frequency and movement of the laminates through the quilting machine may be adjusted to provide the end result such that the aerogel thermal performance is not substantially changed from unquilted laminates of similar thickness and type. Several types of yarns may be used for quilting or stitch bonding as described below including polyester, carbon, polyacrylonitrile, silica, glass, cotton, rayon, acrylics, Kevlar type material, and Nomex type material.

In yet another embodiment, techniques such as stitch bonding can also be used to accomplish the same purpose of joining more than one layer in the laminate. Standard lock and chain stitches may be used or modified lock stitch in which knots linking needle and bobbin threads are formed at one surface of the laminate to minimize in plane fiber distortion. Further information on Stitch bonding is described in Potluri, P. et al., Composite Structures, 59, 251-259 (2003) which is incorporated in its entirety here. It is important to point out that though aerogel type materials are fragile, it was surprisingly found that quilting or stitch bonding does not damage the aerogel composite material enough to have a substantial impact on the thermal performance of the quilted or stitch bonded laminates. This surprising result leads to very simple way of attaching layers of aerogel composites or fiber reinforced aerogel composites without any complex steps.

The needle punching art as a whole is integral to embodiments of the present invention whereby needled products comprising fiber-reinforced aerogels are prepared. The following includes a few non-limiting modes for practicing certain specific embodiments of the present invention, where one comprises the steps of:
   a) disposing a laminate comprising at least one layer of a fiber-containing material adjacent to at least one fiber-reinforced aerogel layer beneath at least one felting needle and where at least one layer being a top layer that defines an exposed surface; and
   b) penetrating said laminate through said exposed surface with said at least one felting needle thereby transporting fibers within the laminate.

Another method comprises the steps of:
   a) disposing a laminate comprising at least two layers of adjacent fiber reinforced aerogels beneath at least one felting needle and where at least one layer being a top layer that defines an exposed surface; and
   b) penetrating said laminate through said exposed surface with said at least one felting needle thereby transporting fibers within the laminate.

The foregoing description is considered as illustrative only of the principles of the invention. Further, since numerous modifications and changes will readily occur to those skilled in the art, it is not desired to limit the invention to the exact construction and process shown as described above. Accordingly, all suitable modifications and equivalents may be resorted to falling within the scope of the invention as defined by the claims that follow. The words "comprise," "comprising," "include," "including," and "includes" when used in this specification and in the following claims are intended to specify the presence of stated features, integers, components, or steps, but they do not preclude the presence or addition of one or more other features, integers, components, steps, or groups thereof.

The invention claimed is:

1. A method of forming an aerogel composite comprising:
providing a laminate including a plurality of layers comprising fiber material and a fiber reinforced aerogel material, at least one layer being a top layer that defines an exposed surface, and at least two of the layers being unsecured to one another; and
penetrating the laminate through the exposed surface with at least one needle, including penetrating at least one layer of fiber material embedded within a substantially continuous matrix, the matrix including aerogel thereby carrying at least some material from one of the layers to another layer to secure the laminate together without additional components.

2. The method of claim 1, wherein the material carried from one of the layers to another layer includes at least some fiber material.

3. The method of claim 1, wherein at least some fiber material from one of the layers is interlaced with fiber material of another of the layers.

4. The method of claim 1, further comprising coating the laminate with a polymeric material.

5. The method of claim 1, wherein the aerogel composite comprises additives.

6. The method of claim 5, wherein the additives are selected from the group consisting of opacifying compounds, radiation absorbing compounds, radiation reflecting compounds, thermally conductive components, electrically conductive components, radar blocking components, and combinations thereof.

7. The method of claim 5, wherein the additives are selected from the group consisting of $B_4C$, Diatomite, Manganese ferrite, MnO, NiO, SnO, $Ag_2O$, $Bi_2O_3$, TiC, WC, carbon black, titanium oxide, iron titanium oxide, zirconium silicate, zirconium oxide, iron (I) oxide, iron (III) oxide, manganese dioxide, iron titanium oxide (ilmenite), chromium oxide, silicon carbide and mixtures thereof.

8. A method of forming an aerogel composite comprising:
providing a laminate including a plurality of fiber-containing layers and a fiber reinforced aerogel material, at least one layer being a top layer that defines an exposed surface, and at least two of the layers being unsecured to one another; and
penetrating the laminate through the exposed surface with at least one needle, including penetrating at least one layer of fiber material embedded within a substantially continuous matrix, the matrix including aerogel thereby transporting fibers within the laminate to secure the laminate together without additional components.

9. The method of claim 8, wherein the fibers transported within the laminate are interlaced with fibers of another of the fiber-containing layers.

10. The method of claim 8, further comprising coating the laminate with a polymeric material.

11. The method of claim 8, wherein the aerogel composite comprises additives.

12. The method of claim 11, wherein the additives are selected from the group consisting of opacifying compounds, radiation absorbing compounds, radiation reflecting compounds, thermally conductive components, electrically conductive components, radar blocking components, and combinations thereof.

13. The method of claim 11, wherein the additives are selected from the group consisting of $B_4C$, Diatomite, Manganese ferrite, MnO, NiO, SnO, $Ag_2O$, $Bi_2O_3$, TiC, WC, carbon black, titanium oxide, iron titanium oxide, zirconium silicate, zirconium oxide, iron (I) oxide, iron (III) oxide, manganese dioxide, iron titanium oxide (ilmenite), chromium oxide, silicon carbide and mixtures thereof.

14. A method of forming an aerogel composite comprising:
providing a laminate including (i) a first layer comprising a fiber material and a substantially continuous matrix, the matrix including aerogel material and (ii) a second layer comprising a fiber material, the first and second layers being unsecured to one another; and
interlacing fibers from at least one of the first and second layers with fibers from the other of the first and second layers to secure the laminate together without additional components.

15. The method of claim 14, wherein the step of interlacing fibers includes penetrating the laminate with at least one needle.

16. The method of claim 14, further comprising coating the laminate with a polymeric material.

17. The method of claim 14, wherein the aerogel composite comprises additives.

18. The method of claim 17, wherein the additives are selected from the group consisting of opacifying compounds, radiation absorbing compounds, radiation reflecting compounds, thermally conductive components, electrically conductive components, radar blocking components, and combinations thereof.

19. The method of claim 17, wherein the additives are selected from the group consisting of $B_4C$, Diatomite, Manganese ferrite, MnO, NiO, SnO, $Ag_2O$, $Bi_2O_3$, TIC, WC, carbon black, titanium oxide, iron titanium oxide, zirconium silicate, zirconium oxide, iron (I) oxide, iron (III) oxide, manganese dioxide, iron titanium oxide (ilmenite), chromium oxide, silicon carbide and mixtures thereof.

* * * * *